INVENTOR:
WILLIAM H. DAILEY, JR.,
BY: Donald G. Dalton
HIS ATTORNEY.

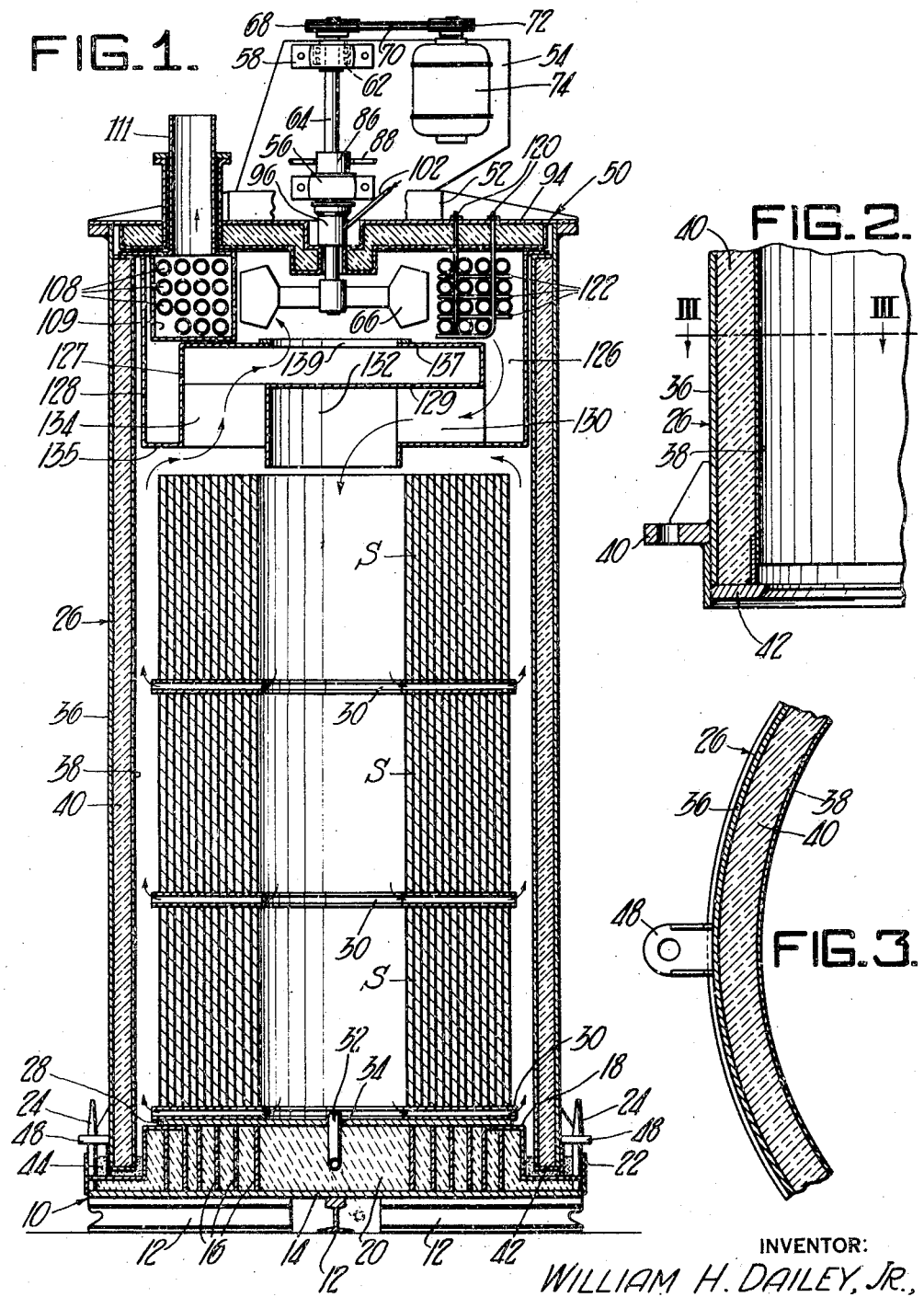

Aug. 16, 1949.   W. H. DAILEY, JR   2,479,102
COIL ANNEALING FURNACE
Filed Feb. 23, 1946   11 Sheets-Sheet 4

INVENTOR:
WILLIAM H. DAILEY, JR.,
BY: Donald G. Dalton
HIS ATTORNEY.

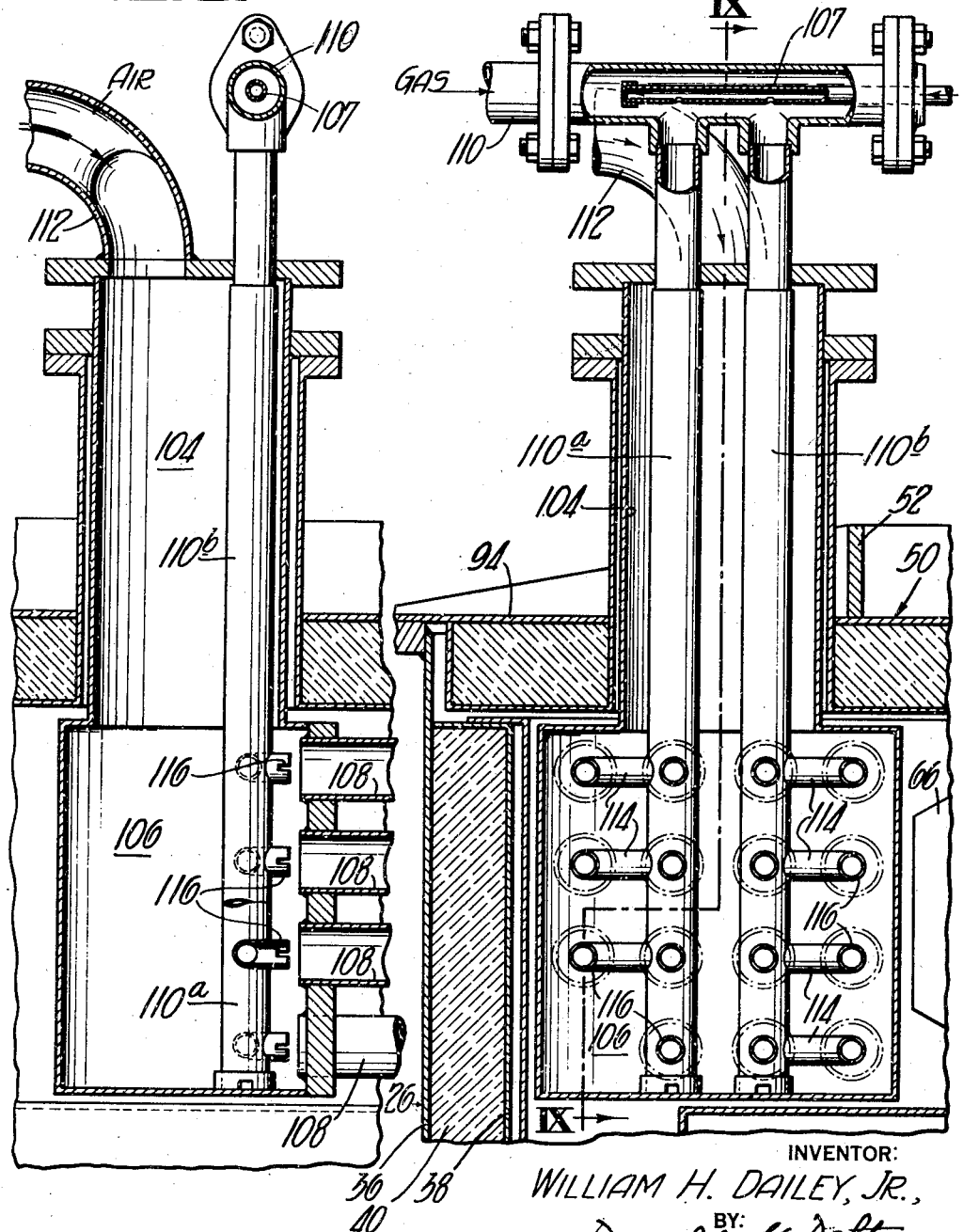

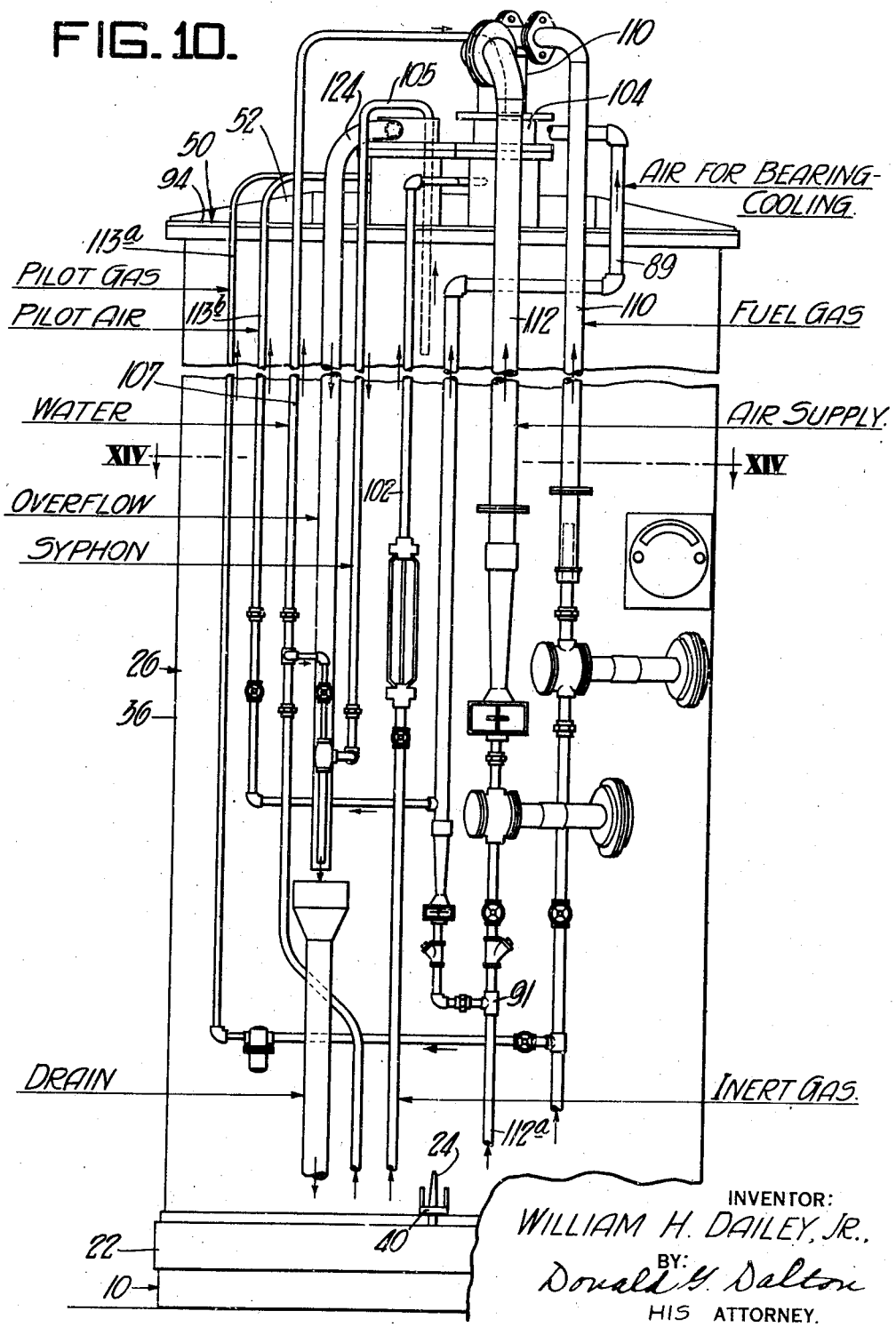

Aug. 16, 1949.　　　　　W. H. DAILEY, JR　　　　2,479,102
COIL ANNEALING FURNACE

Filed Feb. 23, 1946　　　　　　　　　　　　　11 Sheets-Sheet 8

INVENTOR:
WILLIAM H. DAILEY, JR.,
BY
Donald G. Dalton
HIS ATTORNEY.

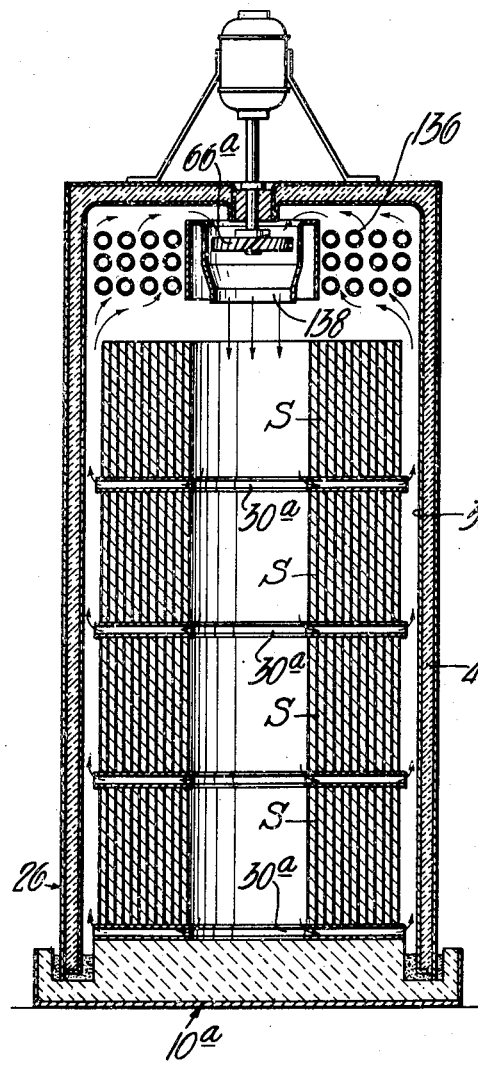
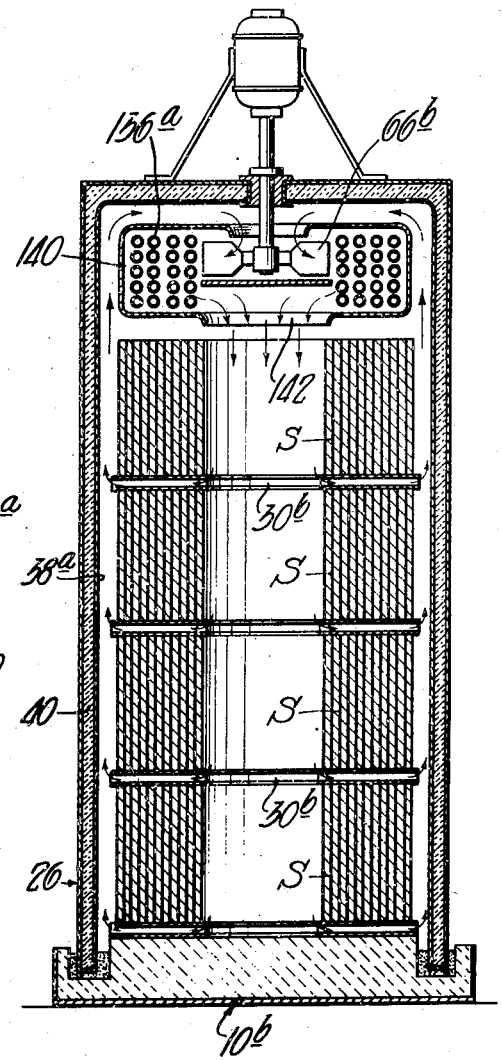

Aug. 16, 1949.    W. H. DAILEY, JR    2,479,102
COIL ANNEALING FURNACE
Filed Feb. 23, 1946    11 Sheets-Sheet 11

INVENTOR:
WILLIAM H. DAILEY, JR.,
BY:
Donald G. Dalton
HIS ATTORNEY.

Patented Aug. 16, 1949

2,479,102

UNITED STATES PATENT OFFICE 2,479,102

COIL ANNEALING FURNACE

William H. Dailey, Jr., Library, Pa., assignor to Carnegie-Illinois Steel Corporation, a corporation of New Jersey Application February 23, 1946, Serial No. 649,635

6 Claims. (Cl. 263—40)

The present invention relates to an improved furnace for the annealing of coils of steel strip.

Conventional means for heating coils of steel strip have heretofore comprised flat steel bases mounting refractory pedestals to support a number of piles of the coiled product, the coils being enclosed within inner protective covers enclosed by large bell-type outer covers resting on the bases and completely enclosing the inner covers. The old furnaces were generally gas-fired by radiant tube-type heaters, and most of the heat was transferred to the coils by radiation from the furnace to the inner covers and from the inner covers to the coils. However, in the prior art constructions, circulation of annealing atmosphere inside the inner covers effected a small amount of heat transfer from the inner cover to the coiled charge by convection. A deoxidizing atmosphere was usually maintained within the inner covers at all times, the deoxidizing gas generally being exhausted through purging outlets or through sand seals at the base of the inner covers.

There are numerous disadvantages inherent in the use of the prior art construction above briefly described. Among these disadvantages are the high cost of the furnace bases and their requirement of a large floor area for installation; slowness of heating and cooling of the coil charge; lack of uniformity of heat transfer, and excessive expense in operation and maintenance of the furnaces.

One object of the present invention is to overcome the above and other objectionable features inherent in the prior art furnaces. Among other objects of the invention are: to provide means for annealing steel products in coiled form which means is materially less expensive to build and install than prior art conventional equipment of similar capacity; to provide means for annealing strip products in coiled form which requires much less floor space than prior art equipment; to provide means for annealing strip product in coiled form wherein the greater part of the heat transfer is effected by convection; to provide for more rapid and uniform heating and cooling of the charge; to provide coil annealing means which are more economical to operate and maintain than prior art furnaces; and to construct and arrange the various instrumentalities herein shown and specifically described so that they individually and collectively perform the various functions set forth.

The invention will be fully apparent by reference to the accompanying drawings, the following detailed description, and the appended claims.

In the drawings:

Figure 1 is a view in vertical longitudinal section illustrating a preferred embodiment of the invention.

Figure 2 is an enlarged detail in vertical section of the lower portion of the furnace.

Figure 3 is a horizontal section on line III—III of Figure 2.

Figure 8 is a detail section on line VIII—VIII of Figure 7.

Figure 9 is a fragmentary section taken on line IX—IX of Figure 8.

Figure 10 is an elevation as viewed from the left of Figure 7, showing the piping layout of the furnace.

Figure 19 is a diagrammatic horizontal section illustrating a slight modification.

Figure 20 is a similar vertical section illustrating a further modification.

Figure 4:
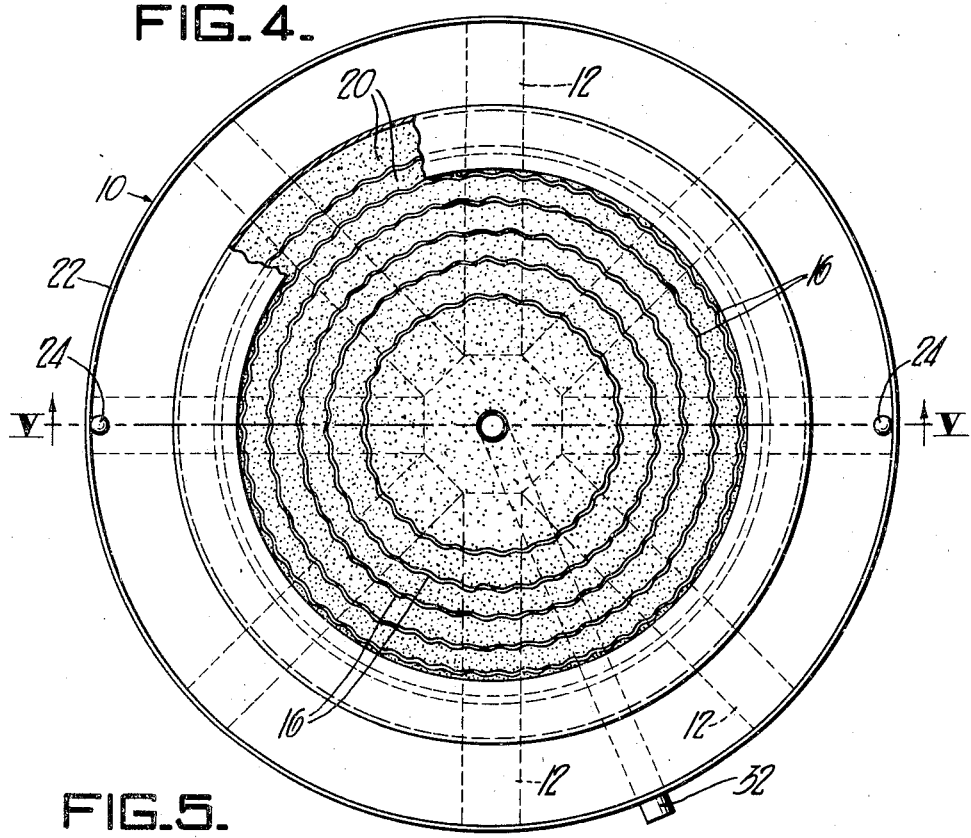
Figure 4 is a plan of the base of the furnace.
Figure 5:
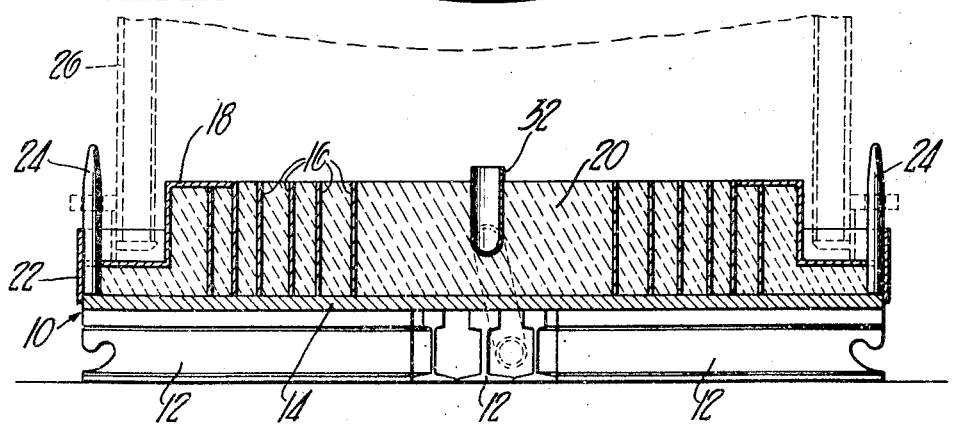
Figure 5 is a horizontal section on line V—V of Figure 4.

As will hereinafter appear more fully, the various embodiments of the invention illustrated show novel annealing furnaces peculiarly well suited for quickly and inexpensively heating coils of steel strip stacked one upon the other, wherein the heat transfer is effected chiefly by convection, thus eliminating the inner covers generally employed in prior types of heating apparatus. Each furnace illustrated comprises, briefly, a lower base portion, an intermediate casing or furnace housing, heat transfer apparatus, and heat distributing means whereby heat transfer is effected by convection rather than by radiation as in conventional furnaces heretofore generally used.

Referring first to the preferred embodiment of the invention illustrated in Figures 1 to 18 inclusive, the disclosure will be segregated under four general headings each briefly describing a fundamental unit of the entire system as follows: the furnace base; the furnace housing; the heat transfer apparatus; and the heat distribution means.

The furnace base

The base of the furnace is shown in detail in Figures 2 to 5, and is indicated generally by reference numeral 10.

The base comprises a series of lengths of standard rail 12 arranged radially as shown, to form a solid supporting framework for a circular steel plate 14 which rests thereon. Mounted on top of the plate 14 is a plurality of substantially concentric rings 16 of corrugated heat-resisting metal, which provide a support for a cap 18 which is placed over the rings after the spaces between them have been filled in with insulating material 20.

Surrounding the base plate 14 and welded thereto at its lower edge is an annular ring 22 which assists in retaining the insulating material 20 under the cap 18. A plurality of upright guide pins 24 are welded or otherwise secured to the base 14 and ring 22 so as to accurately position the furnace housing 26 on the base. After cap 18 has been installed, an upper supporting plate 28 is centered on the cap, and a gas circulating separator member 30 (disclosed more fully in my copending application Serial No. 624,788, filed October 26, 1945, later abandoned) is superposed on plate 28. The coils of strip material, indicated at S, to be annealed, are stacked one over the other with the gas circulating separator plate 30 interposed between adjacent coils. The gas circulating separator member comprises centrally apertured upper and lower horizontal plates with a multiplicity of curved upright metal vanes whose upper and lower edges are secured to said upper and lower plates, the vanes defining a multiplicity of curved gas circulating passages through which the gas is adapted to flow transversely between the superposed coils of the stack being treated. Thus an upright stack of the desired height can be readily assembled for annealing treatment, this stacking, of course, being done after the housing 26 has been removed. The housing is adapted to be lifted by a suitable tackle suspended from an overhead traveling crane, and the pins 24 serve to facilitate properly positioning or centering the housing when it is again placed on the supporting base, as will be understood.

A suitable conduit 32 is provided for the insertion of a thermocouple through the base, this conduit projecting through an opening 34 formed in the center of the upper supporting plate 28 and thus providing access for the determination of temperature conditions of the gases inside the furnace.

The furnace housing

The furnace housing, indicated as a whole at 26, is illustrated in detail in Figures 1 to 3, and consists of an outer gas-tight shell 36 formed of a steel plate which is of sufficiently heavy gauge to act as a support for the heat transfer apparatus at the top, described more fully hereinafter, and an inner shell 38 of relatively light-gauge steel with a filling of insulating material 40 between the two shells, the inner shell serving to prevent permeation of the annealing atmosphere through the insulation 40.

In order to allow for expansion and contraction of the inner shell due to temperature variations, there is no rigid connection between the shells 36 and 38, and the base portion 42 of the outer shell is designed to accommodate the inner shell by a sliding fit only. The lower end of the furnace housing enters a body of sealing sand 44 retained in the annular channel 46 formed in the base member 10, as shown in Figure 1. Thus the sand seal restricts the outer flow of gases contained within the housing 26. The housing is equipped on its exterior with lugs 48 which are suitably perforated to slide over the guide pins 24 which are secured to the base member 10.

Figure 6:
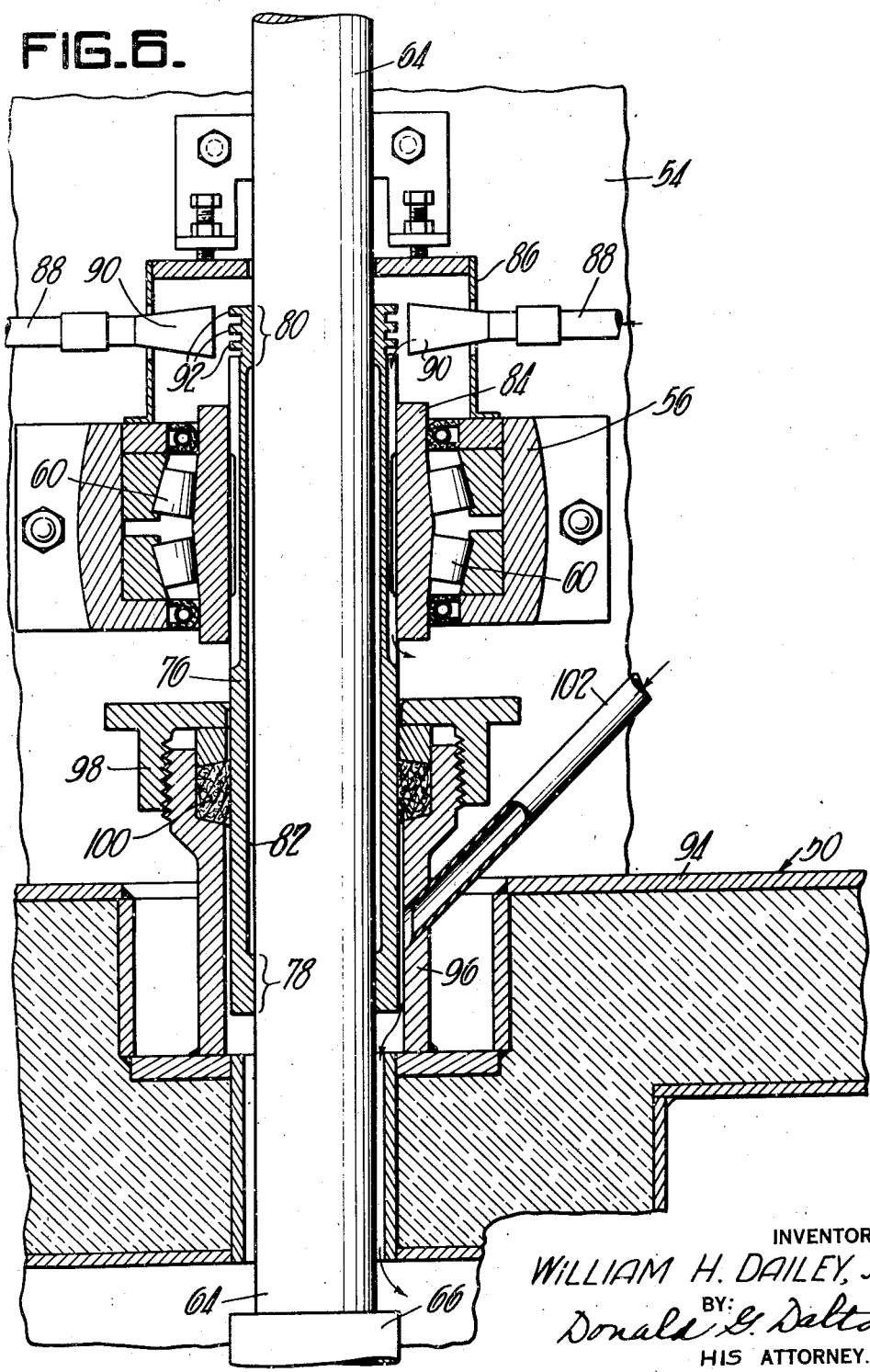
Figure 6 is an enlarged vertical section of the top portion of the furnace.
Figure 7:
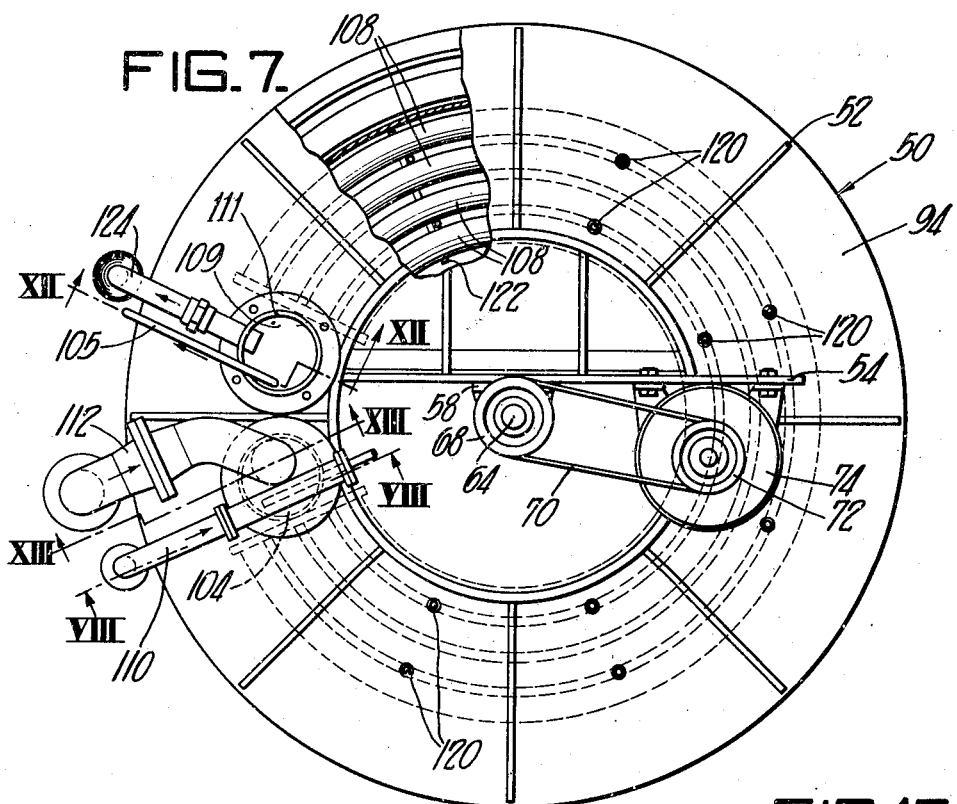
Figure 7 is a plan view of the furnace.
Figure 12:
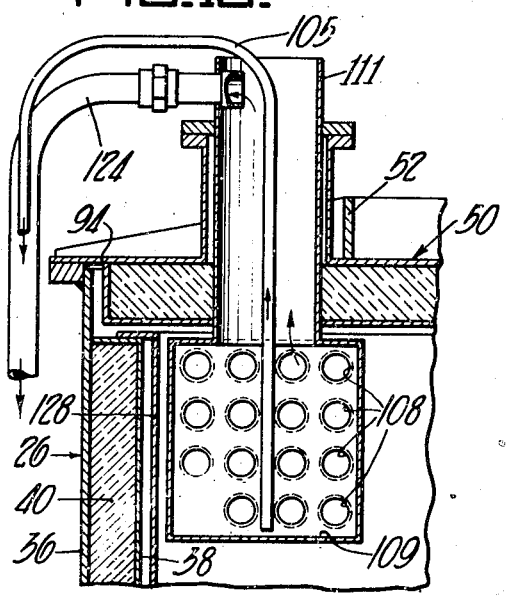
Figure 12 is a section on line XII—XII of Figure 7.
Figure 13:
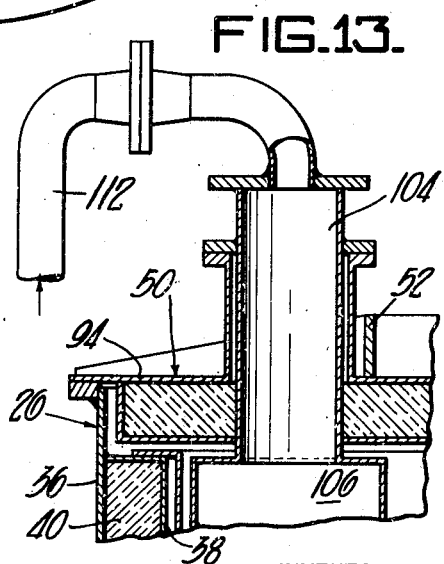
Figure 13 is a section on line XIII—XIII of Figure 7.
Figure 11:
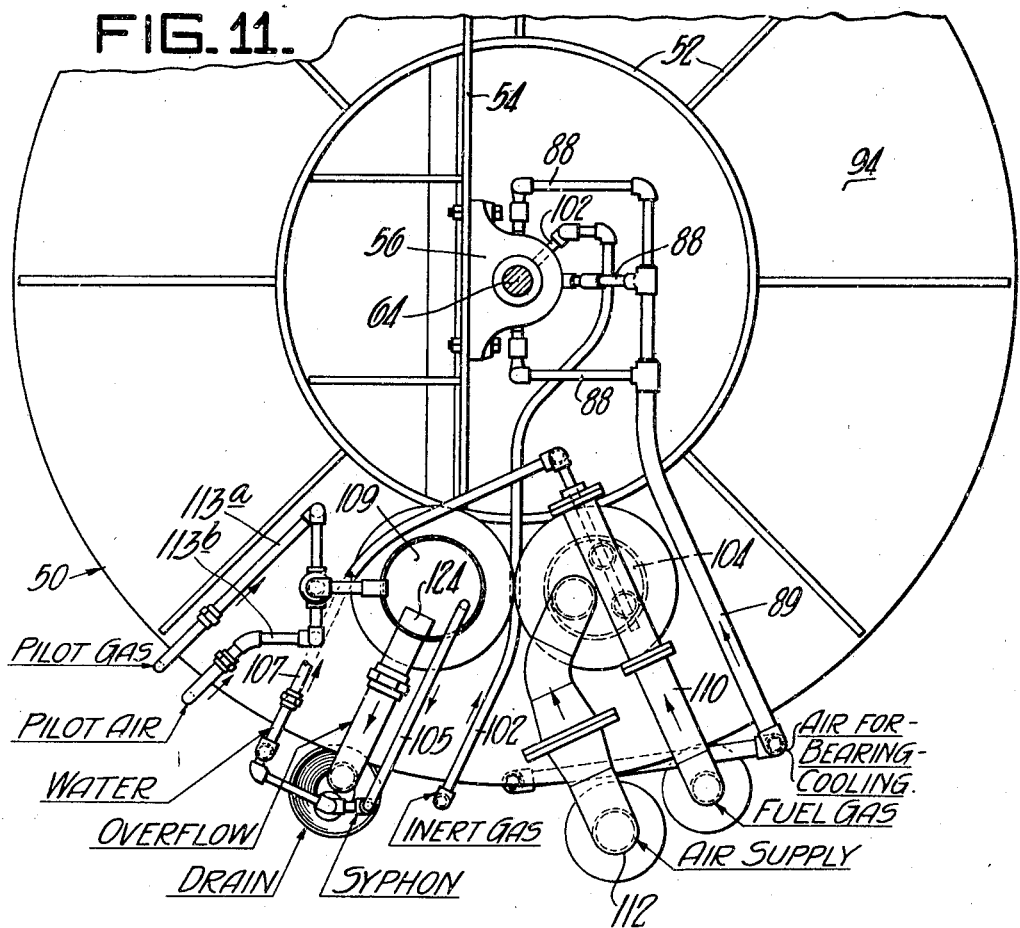
Figure 11 is a partial plan view of Figure 10.
Figure 14:
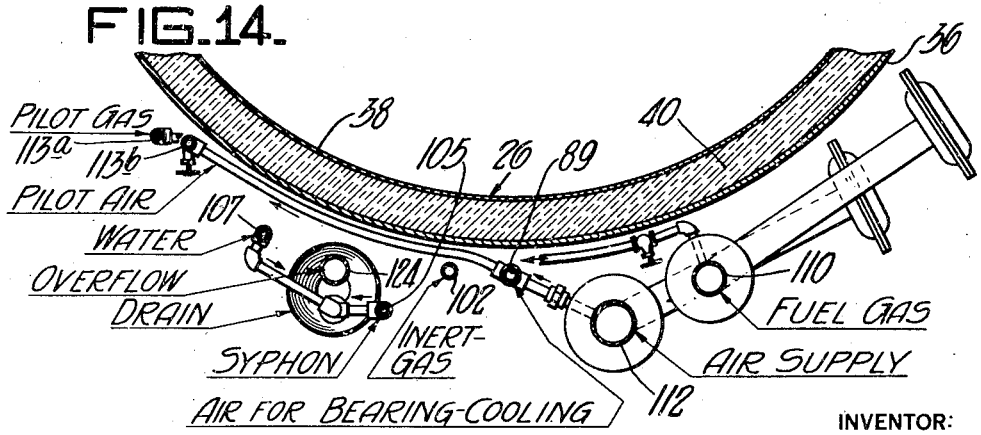
Figure 14 is a section on line XIV—XIV of Figure 10.
Figure 15:
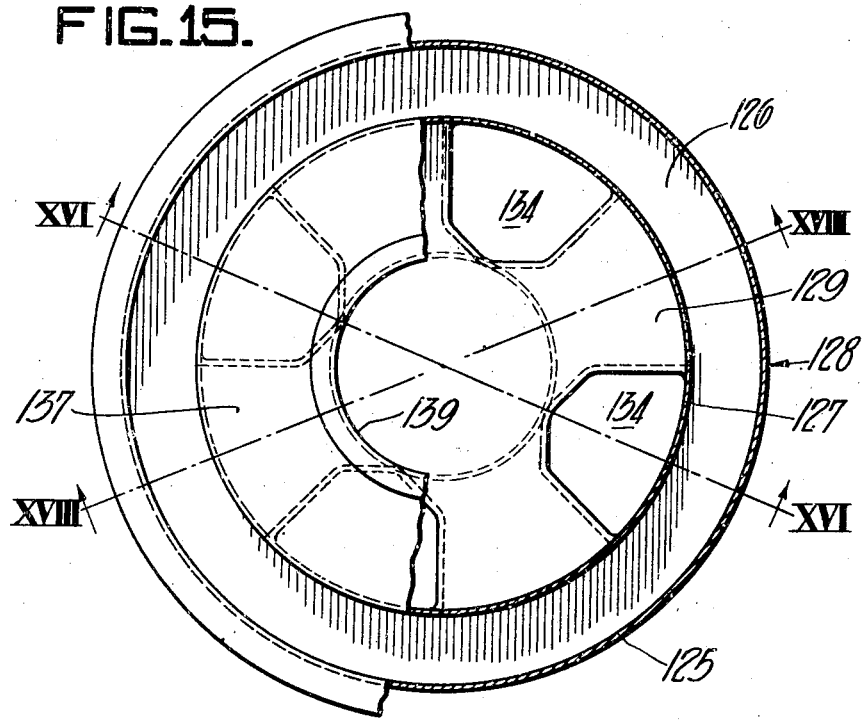
Figure 15 is a section on line XV—XV of Figure 16.
Figure 16:
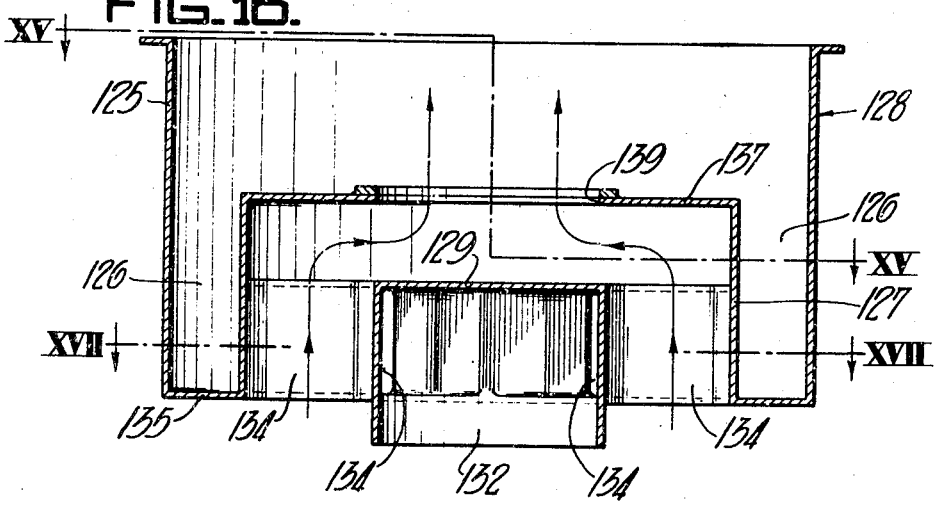
Figure 16 is a detail of an upper portion of the furnace casing, taken on line XVI—XVI of Figure 15, showing principally the gas circulation.
Figure 17:
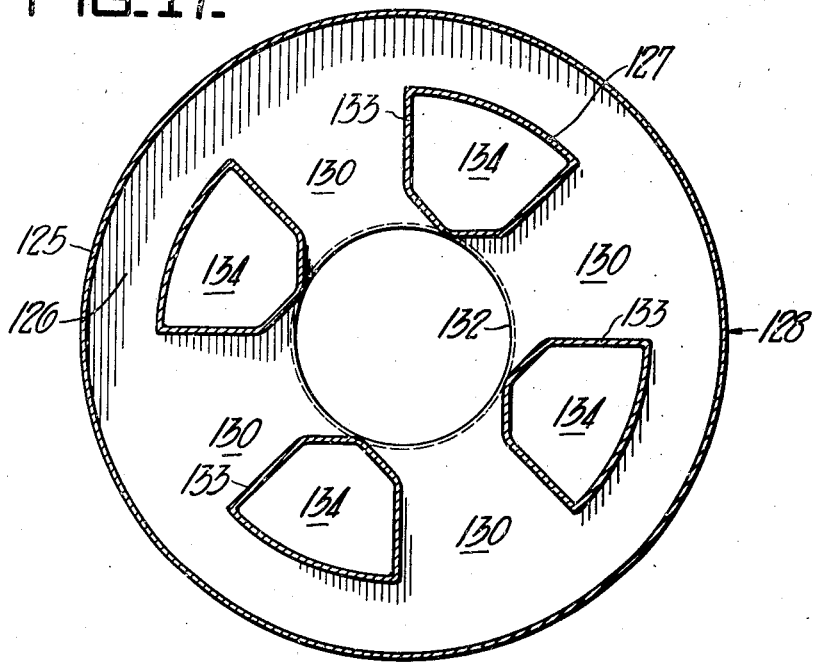
Figure 17 is a section on line XVII—XVII of Figure 16.
Figure 18:
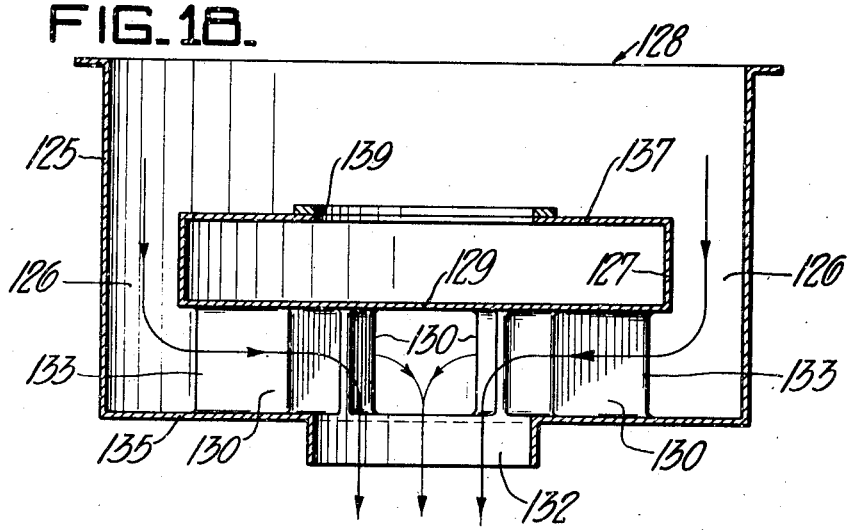
Figure 18 is a vertical section on line XVIII—XVIII of Figure 15.

The construction of the top or roof 50 of the housing 26 is best shown in Figures 1 and 6. This top includes a spider-like frame structure 52 which supports an upright plate 54 having pillow blocks 56 and 58 mounted thereon supporting antifriction bearings 60 and 62 which rotatably support a shaft 64 having a fan or impeller 66 secured to the lower end thereof. At its upper end the shaft carries a pulley 68 which is adapted to be driven through belt 70 from a pulley 72 secured to the armature shaft of a motor 74, also mounted on the upright plate 54. The fan impeller 66 and the lower end of the fan shaft 64 are subjected to the intense heat of a heating means to be described hereinafter, and therefore special means are provided for cooling the lower portion of the fan shaft 64 and at least the lower bearing 60 supporting it. This cooling means includes a sleeve 76 which contacts the shaft only at restricted areas 78 and 80, there being a clearance space 82 formed therein. The exterior of the sleeve 76 is provided with a plurality of longitudinally extending grooves, all as more fully set forth in copending application Serial No. 650,082, filed February 25, 1946, now Patent No. 2,439,127, in which I am co-inventor with Edward A. DiNucci.

The bearing 60 includes a raceway bushing 84 which surrounds the sleeve and on which conventional bearing rollers travel. A casing 86 encloses the upper end of the sleeve 76, and a plurality of pipes 88 connect with a suitable supply of compressed air. These pipes are equipped with nozzles 90 which extend through the casing 86 and are adapted to impinge jets of cooling air on annular fins 92 formed by grooving the upper end of the sleeve 76. The cooling air impinged on the fins is adapted to flow downwardly through the grooves formed in the exterior of the sleeve, and to be expelled to the atmosphere at the ends of the slots in the sleeve which terminate beyond the lower end of the raceway bushing 84.

The top 50 of the housing includes a top plate 94 to which is welded or otherwise secured a stuffing box housing 96 surrounding the lower portion of the sleeve 76 and having a gland nut 98 for compressing packing 100 around the lower portion of the sleeve so as to prevent the outflow of gaseous atmosphere from the interior of the furnace housing. A pipe 102, connected to a suitable source of deoxidizing gas (not shown) is welded or otherwise connected to the gland casing 96 so as to provide for the introduction of the deoxidizing gas into the furnace through the clearance space between the sleeve 76 on the fan shaft 64 and the inner wall of the stuffing box.

Heat transfer apparatus

The heat transfer apparatus or heat exchanger is best shown in Figures 1 and 7 to 14 inclusive.

Air for combustion enters the apparatus at the top of the furnace and passes down through an entry pipe 104 into an air inlet manifold 106. A series of concentric loops of pipe 108 open into the manifold 106, and continue around the furnace to an exhaust manifold 109 where the products of combustion are exhausted to atmosphere through pipe 111. Two combustion gas supply lines 110a and 110b are carried through the entry air pipe 104, with branch lines 114 which terminate in nozzles 116 projecting into the heater pipes 108. These nozzles are surrounded by streams of air to support combustion, and are designed to provide a controlled mixing action of the gas and air. The combustible gas and air mixture is ignited by an electric spark device or other suitable means located in the air manifold 106, and all combustion takes place within the heater pipes 108. A plurality of heat-resisting metal hangers 120 and tube supports 122 are provided at suitably spaced intervals to support the heater pipes.

Upon completion of the heating cycle, that is to say, after the stack of coils has been subjected to an annealing heat of desired temperature for a predetermined time interval, the gas will be shut off and air will be circulated through the heater pipes for cooling. After the heater pipes have cooled sufficiently, the air will be shut off and then cold water will be slowly added via pipe 107 to the inlet manifold 104 and circulated through the heating pipes to the exhaust manifold 109, where a cooling water overflow 124 is provided. After the burner pipes have been filled with cooling water, the circulating fan 66 may be operated to effect rapid cooling of the atmospheric gases. Cooling water will be siphoned by pipe 105 from the heater tubes upon completion of the cooling cycle. Suitable pipe connections making the above operations possible are indicated in Figure 10, as indicated by the legends and arrows of this figure. Pipes 113a and 113b supply gas and air respectively for a pilot lighter of conventional form. The coolant, which is usually water, is supplied to the manifold 106 by a pipe 107.

Fuel gas is supplied to the burner pipes by supply main 110, and air to support combustion is supplied by pipe 112 which connects with a compressed air reservoir (not shown). The air for cooling the fan shaft and bearing is conveniently supplied via pipe 89 from the same source as that which furnishes the combustion air, the pipe 89 being connected by a fitting 91 with the air supply pipe 112a, as shown in Figure 10.

Heat distribution means

The construction and arrangement of the means for effecting efficient circulation of hot atmospheric gases inside the furnace are best shown in Figures 1 and 15 to 18 inclusive. As indicated by the arrows in these figures, the direction of flow introduced by the circulating fan 66 is controlled by the gas distributing structure illustrated. This structure comprises an outer cylindrical shell 125, an intermediate shell 127 concentric therewith having four equally spaced ports 130 formed in the lower portion thereof, a central nozzle 132, and a circular plate 129 having four vertical ports 134 bounded jointly by the solid portions of shell 127 and the substantially U-shaped plates 133. The annular space between the central nozzle 132 and the outer shell 125 is closed by a bottom ring-plate 135, and a top circular ring plate 137 having a central opening 139 therein is welded or otherwise secured to the upper edge of the intermediate shell 127 as shown.

The atmospheric gas is circulated around the heater tubes 108 by the fan, then downwardly through the outside passages 126 in the gas distributor 128, and inwardly through the center of the furnace through vertical ports 130 and out through the central nozzle 132 of the distributor, which directs the flow downwardly through the open centers or voids in the coils S. The flow is directed downwardly through the centers of the coils, as indicated by the arrows, thence upwardly through the separator plates 30 between the adjacent coils and thence upwardly between the outer surface of the coils S and the inner surface of the furnace housing to the top of the furnace. At this region a certain portion of the gas is again drawn downwardly through the coils, due to the inspirating effect of the gas distributor nozzle 132, while the balance of the gas continues upwardly through the ports in the distributor and back through central opening 139 to the circulating fan.

General

Although the above detailed description of the improved apparatus for annealing coiled strip material discloses a desirable arrangement the practicability of which has been demonstrated in practice by use of the single stand furnace illustrated, the invention is not limited to this particular design and arrangement. Various means for circulating hot atmospheric gas are possible by alternate designs of heat distribution means referred to in the modifications described below, in connection with Figures 21 to 24.

My improved convection furnace can be employed for annealing coils either in single piles or in multiple piles, and in all of these alternative adaptations of the invention the heat transfer will be made substantially entirely by convection rather than by radiation as in conventional furnaces heretofore generally used by the industry. Such modifications are shown somewhat diagrammatically in Figures 19 to 22 inclusive.

Figure 19 shows a single stand furnace, and incorporates means for maintaining an axial flow of the circulating hot gases by use of a motor-driven fan 66a effective to draw the hot gases over heat exchanger 136 comprising a multiplicity of heater tubes adapted for either heating or cooling the gases. The fan blows the gases directly downwardly, as indicated by the central arrows, through the distributor nozzle 138, and into the hollow centers of the stack of coiled strip S. As described in the preferred construction, air circulating separators 30 are interposed between adjacent coils, and a portion of the gas circulates laterally as indicated by the arrows in the figure.

Figure 20 illustrates a modification in which a centrifugal type of fan 66b draws relatively cool gas into the center and then forces the gas outwardly over the heat exchanger tubes 136a. The hot gases are then directed back towards the gas distributor nozzle by means of an enclosure 140 around the heat exchanger tubes, the gas finally emerging through the nozzle 142. The gas finally emerges from the nozzle 142 and passes downwardly, as indicated by the arrows, through the centers of the coils 8, some of the gas escaping laterally through the gas separator plates between the coils and the gas flowing upwardly between the exterior of the coils and the inner surface of the housing to the top central opening of the enclosure 140 above the fan, as indicated by the arrows.

Figure 21:
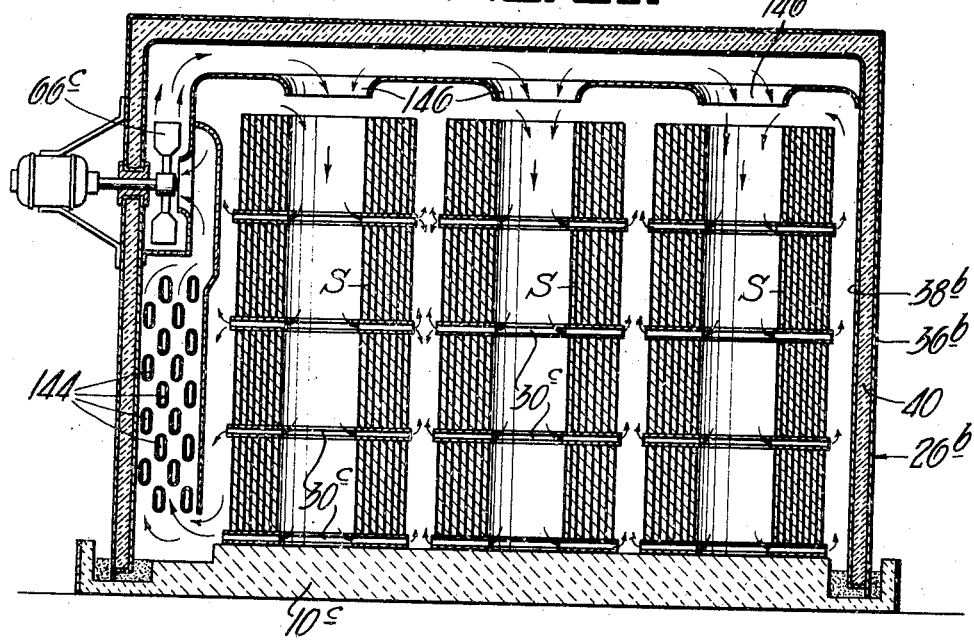
Figure 21 is a vertical section illustrating another modification.
Figure 22:
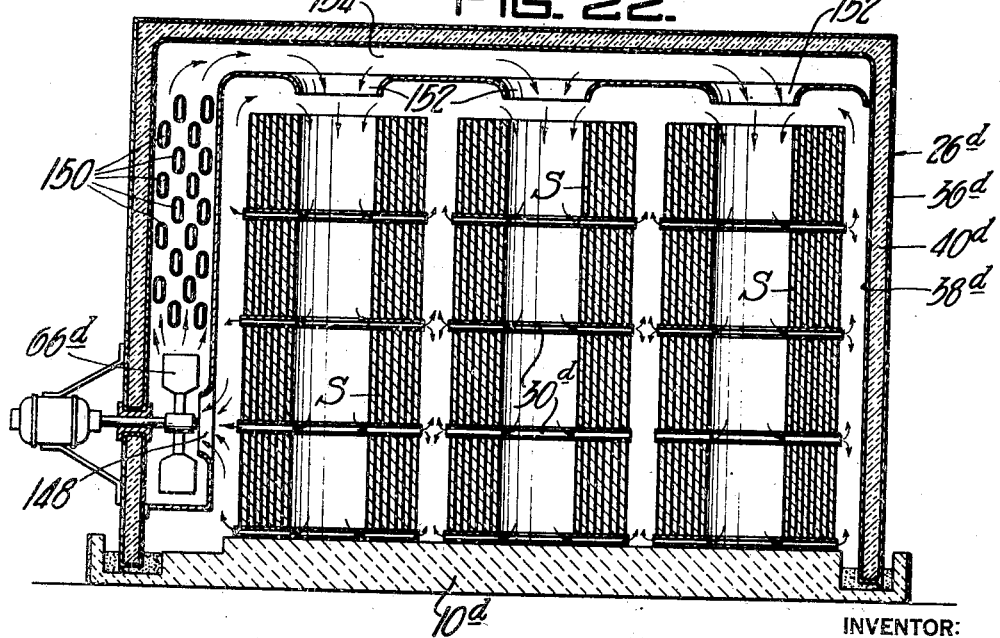
Figure 22 is a diagrammatic vertical section illustrating a further modification.

Figures 21 and 22 show a multiple stand arrangement. As illustrated in these figures, there are three stacks of coils in a row, and the furnace will generally be two rows deep.

In the modification of Figure 21 there is a motor-driven fan 66° located above the heat exchanger tubes 144. This fan draws the gases over the tubes, as indicated by the arrows, before circulating it downwardly through the gas distributor nozzle 146.' As in the other figures, part of the gas escapes laterally through the gas separators interposed between adjacent coils, the direction of circulation being indicated by the arrows.

In the modification of Figure 22, the motor-driven circulating fan 66ᵈ draws the gases through an intake nozzle 148, circulates the gas around heat exchanger tubes 150, the gas being directed downwardly through nozzles 152 formed in a main 154 at spaced intervals aligned with the centers of the openings in the several stacks of coils, as shown.

The inner furnace shell 38 of Figure 1, as well as the inner shell 38ᵃ shown in Figures 19 and 20, serve to prevent oxygen which may be present in the refractory insulating material 40 of the housing, from uniting with the hydrogen or other gas which might be present in the annealing atmosphere gas. Thus the formation of surface oxides on the material being annealed is prevented. The inner shells 38 and 38ᵃ also serve to keep the refractory material in the furnace covers in their proper place in the structure.

The conjoint action of the structure and arrangement herein claimed makes possible a greatly increased output of annealed coiled product due largely to the increased overall heat transfer efficiency. Such increased efficiency is due in part to effecting the heat transfer chiefly by convection of the hot deoxidizing gas which is circulated downwardly by the fan and in contact with the heating means and thence by coaction with the described gas distribution structure in cooperation with the separators interposed between the adjacent coils. The lateral passages in the separators allow the hot deoxidizing gas to flow laterally between the coils and thus transfer heat through the ends of the coils by conduction, thus insuring substantially uniform heating over all parts of each coil in the stack regardless of the size or diameter of the coil. The gas flowing outwardly through the lateral passages of the gas circulating separators then flows upwardly and in contact with the exterior surfaces of the coils, thereby heating such surfaces by convection from both the inside and outside and by conduction from the top and bottom ends of the coils. Practice has demonstrated that any diameter of coils, in stacks as high as 13 feet, can be successfully and very quickly annealed.

While in the foregoing disclosure I have described in considerable detail preferred structures and arrangements which are regarded as highly desirable, it is to be understood that the drawings and description are to be interpreted in an illustrative rather than a limiting sense, since various modifications, rearrangements of parts and substitutions of equivalents may be made by those skilled in the art without departure from the spirit and scope of the invention as expressed in the appended claims.

I claim:
1. A furnace for annealing coils of metal strip, comprising a support on which the coils are adapted to be vertically stacked, separators between adjacent coils having a multiplicity of lateral passageways therein, a cover enclosing said coils and having a gaseous medium therein, heating means within the top portion of the cover, a fan surrounded by the heating means, a gas distribution structure having portions below the fan and the heating means effective in conjunction with said fan to cause the gaseous medium to flow in heat exchange contact with said heating means downwardly through the centers of said coils, laterally through the passages of said separators and then upwardly in contact with the exterior of said coils.

2. A furnace for annealing coils of metal strip, comprising a support on which the coils are adapted to be vertically stacked, separators between adjacent coils having a multiplicity of lateral passageways therein, a cover enclosing said coils and having a gaseous medium therein, a heat exchanger within the top portion of the cover, a fan surrounded by the heat exchanger and secured to a shaft supported in bearings mounted outside of and above the furnace top, means for air cooling at least one of said bearings and the lower portion of the fan shaft, and a gas distribution structure having portions below the fan and the heat exchanger effective in conjunction with said fan to cause a gaseous medium to flow in contact with said heat exchanger, thence downwardly through the centers of the coils, laterally through the passages of said separators, and then upwardly in contact with the exterior of the coils.

3. A furnace for annealing coils of metal strip chiefly by convection and conduction, comprising a support on which the coils are adapted to be vertically stacked, a cover enclosing said coils, a heat exchanger including a multiplicity of loops of pipe within said cover, respective inlet and outlet manifolds with which the ends of said loops communicate, means for delivering fuel gas to the inlet ends of said loops of pipe, the inlet ends of said loops opening into the inlet manifolds, a combustion air inlet duct connected to the inlet manifold, a spent gas outlet duct leading from the outlet manifold, means for supplying a coolant to said loops of pipe, and means for withdrawing the coolant from the apparatus via one of said manifolds.

4. A furnace for annealing coils of metal strip chiefly by convection and conduction, comprising a support on which the metal coils are adapted to be vertically stacked, a heat exchanger comprising a multiplicity of substantially circular loops of pipe whose opposite ends open into respective inlet and outlet manifolds, means supplying fuel to the ends of said loops connected to the inlet manifold, means supplying combustion air to the inlet manifold, a fan substantially surrounded by said loops of pipe, means for supplying a deoxidizing gas to the furnace, a gas distribution structure including an outer cylindrical shell surrounding the heat exchanger and the fan, an inner nozzle portion for directing the heated deoxidizing gases downwardly through the central void of the stack of coils, a circular plate closing the top of said nozzle portion and having ports therein located outwardly beyond the nozzle portion, an intermediate shell embracing said circular plate, a ring plate spaced above said circular plate and secured to the top of said intermediate shell, said intermediate shell having a plurality of lateral ports in its lower portion, a bottom plate beyond which said nozzle extends, and a plurality of substantially U-shaped upright partition shells adjacent the latter ports and secured at their top edges to said circular plate and at their bottom edges to said bottom plate, the parts defined being thus so constructed and arranged that the fan compels a circulation of the hot deoxidizing gas downwardly through the centers of the coils, laterally through the passages in the spacer members interposed between adjacent coils, and upwardly in contact with the exteriors of the coils.

5. A furnace for annealing metal strip, comprising a support for said strip, a cover enclosing said strip and having a gaseous medium therein, a heat exchanger within the top portion of the cover, a fan surrounded by the heat exchanger and secured to a shaft supported in bearings mounted outside of and above the furnace top, means for air cooling at least one of said bearings and the lower portion of the fan shaft, and a gas distribution structure within said cover having portions below the fan and the heat exchanger effective in conjunction with said fan to cause a gaseous medium to flow in contact with said heat exchanger, thence downwardly around the strip.

6. A furnace for annealing coils of metal strip, comprising a support on which the coils are adapted to be vertically stacked, separators between adjacent coils having a multiplicity of lateral passageways therein, a cover enclosing said coils and having a gaseous medium therein, heating means within the cover, a fan surrounded by the heating means, a gas distribution structure having portions between the fan and the heating means effective in conjunction with said fan to cause the gaseous medium to flow in heat exchange contact with said heating means through the centers of said coils, laterally through the passages of said separators and then in contact with the exterior of said coils.

WILLIAM H. DAILEY, Jr.

REFERENCES CITED

The following references are of record in the file of this patent:

UNITED STATES PATENTS

| Number | Name | Date |
|---|---|---|
| 1,564,566 | Harris | Dec. 8, 1925 |
| 1,691,259 | Tamele | Nov. 13, 1928 |
| 1,711,821 | Abbott | May 7, 1929 |
| 1,884,898 | Smith | Oct. 25, 1932 |
| 2,039,429 | Lydon | May 5, 1936 |
| 2,181,928 | Vaughan | Dec. 5, 1939 |
| 2,245,647 | Burby et al. | June 17, 1941 |